April 8, 1958 — A. N. STANTON — 2,829,520
PRESSURE RESPONSIVE TRANSDUCERS
Filed Feb. 14, 1955 — 2 Sheets-Sheet 1
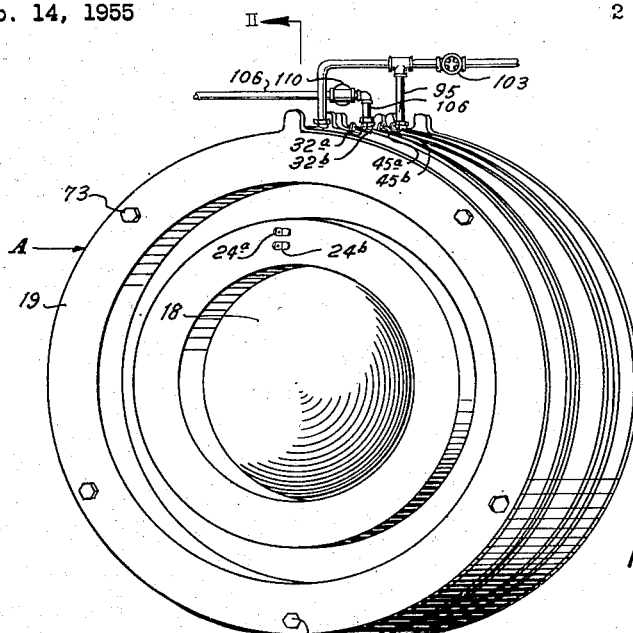
Fig. 1
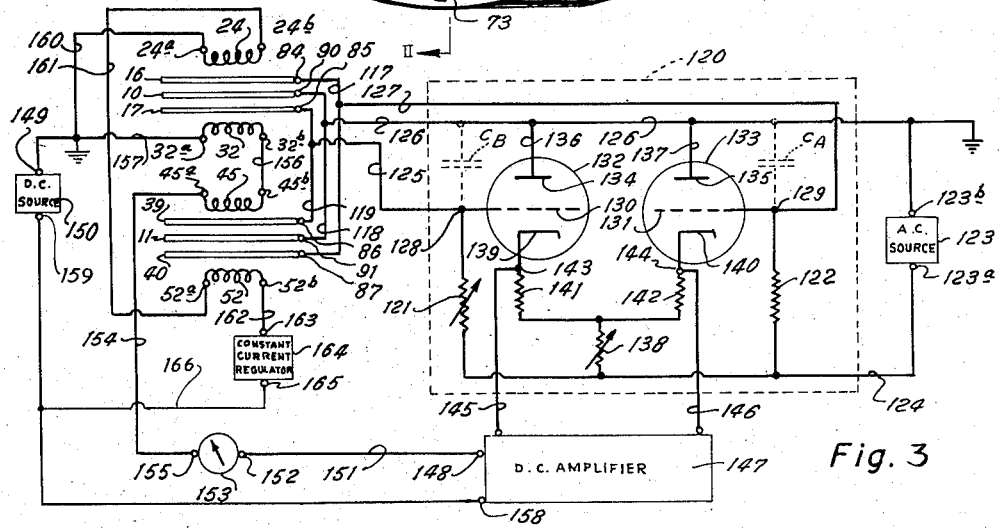
Fig. 3
Fig. 4
Austin N. Stanton
INVENTOR.
BY
ATTORNEY Austin N. Stanton
INVENTOR.

BY *Walter J. Jayne*

ATTORNEY

United States Patent Office 2,829,520
Patented Apr. 8, 1958

2,829,520

PRESSURE RESPONSIVE TRANSDUCERS

Austin N. Stanton, Garland, Tex.

Application February 14, 1955, Serial No. 487,958

8 Claims. (Cl. 73—398)

This invention relates to a new and improved transducer, and more particularly to a new and improved transducer of the moving diaphragm type.

Existing moving diaphragm type transducers are of relatively complex construction and are subject to limitations in their operating range, speed of response, trouble free life, and ability to compensate for environmental conditions including mechanical vibrations, rapid accelerations, changing gravitational effects, temperature effects, etc.

The device of my invention utilizes a new and improved structure and arrangement of parts, embodying novel means for suspending diaphragms, compensating for errors, and applying restoring forces to diaphragms, to overcome the above mentioned disadvantages of moving diaphragm type transducers used prior to my invention.

Accordingly, it is an object of my invention to provide a new and improved transducer of the moving diaphragm type.

It is another object of my invention to provide a new and improved transducer of the moving diaphragm type which shall be of relatively simple construction and which shall have a long trouble free life.

It is another object of my invention to provide a new and improved transducer of the moving diaphragm type, wherein the diaphragm itself is essentially the only moving part.

It is another object of my invention to provide a moving diaphragm type transducer having an adjustable speed of response.

It is another object of my invention to provide a new and improved transducer of the moving diaphragm type which is readily operable over an extremely wide range of magnitudes of the measured quantity.

It is another object of my invention to provide a new and improved device for measuring fluid pressures.

It is another object of my invention to provide a new and improved sensitive balance or scale device.

It is another object of my invention to provide a new and improved device for determining altitude.

It is another object of my invention to provide a new and improved device for determining rate of change of altitude.

It is another object of my invention to provide a new and improved device for measuring acceleration.

It is another object of my invention to provide a new and improved vacuum gauge.

It is another object of my invention to provide a new and improved transducer of the moving diaphragm type wherein compensation for errors introduced by undesirable diaphragm displacement is simply and automatically effected.

Additional objects and advantages of my invention will be apparent from the following description of a preferred embodiment thereof, taken in conjunction with the accompanying drawings in which:

Fig. 1 is a schematic perspective view of a diaphragm assembly in accordance with one embodiment of my invention;

Fig. 3 is a schematic diagram including electric circuits illustrating principles of my invention; and Fig. 4 is a diagrammatic representation of a magnetic circuit in accordance with my invention.

Figure 2:
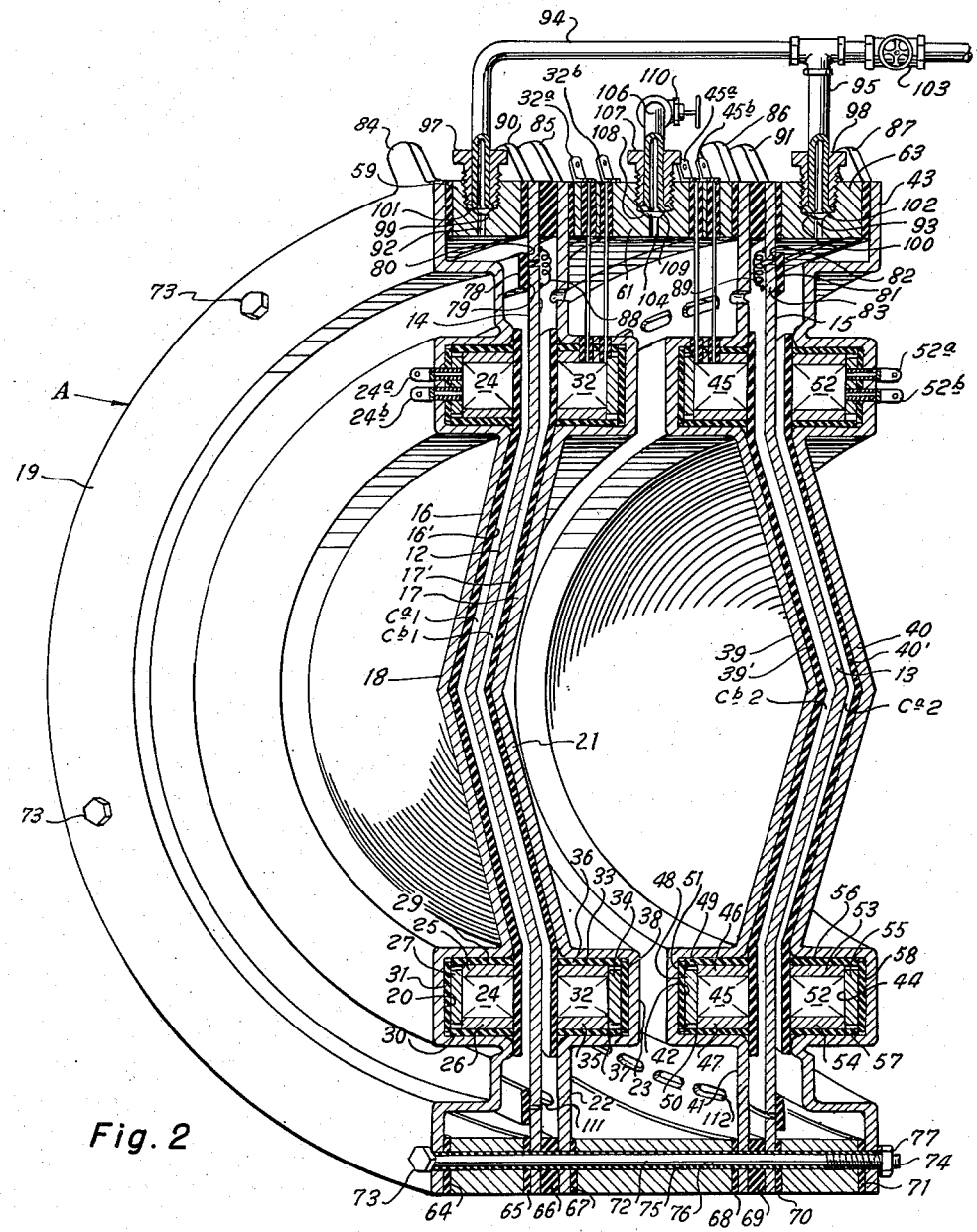
Fig. 2 is an enlarged sectional view taken along lines II—II of Fig. 1.

The diaphragm assembly A in accordance with one embodiment of my invention, shown in Figures 1 and 2, comprises a pair of disk-like diaphragms 10 and 11 each having a conical central section 12 and 13 bounded by an outer circular rim section 14 and 15. Diaphragm 10 is positioned between circular housing members 16 and 17. Housing member 16 is provided with a conical central section 18, an outer flat rim 19, and a concentric annular recess 20. The inner surface of conical section 18 and the area across the opening of recess 20 of member 16 are uniformly spaced from opposed surfaces of diaphragm 10. Housing member 17 is positioned adjacent the opposite surface of diaphragm 11 and has a central conical surface 21, an outer flat rim 22, and a concentric annular recess 23. The inner surface of conical section 21 and the area across the opening of recess 23 are also uniformly spaced from corresponding surfaces of diaphragm 10. A concentrically wound coil 24 is positioned in the recess 20 of housing member 16 and is bounded by ring 25 of magnetic material on its inner periphery, a ring 26 of magnetic material on its outer periphery and a flat ring 27 in contact with the outer edges of rings 25 and 26. The magnetic rings 25, 26, and 27 are separated from the inner wall of recess 20 by means of insulating spacer rings 29, 30, and 31, respectively. Coil 32, magnetic rings 33, 34 and 35, and insulating spacer rings 36, 37, and 38 are similarly disposed in recess 23 of housing member 17.

Diaphragm 11 is disposed between housing members 39 and 40 in the same manner that diaphragm 10 is disposed between housing members 16 and 17. The central axis of diaphragm 10 and the housing members 16 and 17 and the diaphragm 11 and housing members 39 and 40 coincide to form a disk-like assembly, however the apices of the conical sections of housing member 39, diaphragm 11, and housing member 40 face in a direction opposite to that in which the apices of the conical sections of diaphragm 10 and its housing members 16 and 17 face. Housing section 39 is provided with a flat outer rim 41 and a concentric recess 42 similar to those of housing section 17, and housing section 40 is provided with a flat outer rim 43 and a concentric recess 44 similar to those of housing section 16. The recesses 42 and 44 of housing sections 39 and 40 are provided with coil assembly comprising concentrically wound coil 45, magnetic rings 46, 47, and 48, and insulating spacer rings 49, 50 and 51; and coil assembly comprising concentrically wound coil 52, magnetic rings 53, 54, and 55, and insulating spacer rings 56, 57, and 58, respectively, which are identical in structure and assembly as those of housing members 16 and 17.

To permit connection of coils 24 and 52 to external electrical circuitry, the ends of coil 24 are connected to terminal lugs 24a and 24b and the ends of coil 52 are connected to terminal lugs 52a and 52b which are lead through the magnetic ring 27, insulating spacer 31 and the wall of housing member 16, and the magnetic ring 55, insulating spacer 58 and wall of housing member 40, respectively, in pressure tight and insulated relation in accordance with conventional methods. Similarly, the ends of coils 32 and 45 are lead through sealed insulating bushings 23a, 23b and 44a, 44b to terminals 32a, 32b and 45a, 45b which pass through spacer ring 61 in sealed and insulated relation in accordance with conventional methods. The two diaphragm assemblies described above are maintained in fixed spaced relationship to each other by means of rings 59, 61, 63 and associated sealing and insulating gasket rings 64 through 71 as shown. The entire assembly is held together by a plurality of bolts 72 having headed ends 73 and threaded shanks 74 which pass through insulating sleeve 75 inserted in apertures 76 extending through the spacer rings 59 through 63, outer rims of housing members 16, 17, 39 and 40, and sealing and insulating rings 64 through 71. Nuts 77 are threaded on the protruding ends of threaded shanks 74 and drawn sufficiently tight to hold the parts in rigid assembly and to maintain a tight seal between the sealing and insulating rings 64 through 71 and their adjacent parts.

Diaphragm 10 is supported by means of a circular band 78 of silicone rubber, or other suitable flexible material, which is bonded at 79 and 80 to the surface adjacent the outer edge of rim 14 of diaphragm 10 and the surface adjacent the inner edge of ring 60. The diaphragm 11 is similarly supported by a circular band 81 of similar material which is bonded at 82 and 83 to rim 15 and the ring 62, respectively.

Completely assembled, the assembly A forms a pair of double capacitors. The housing members 16 and 17 form separate plates of one double capacitor with the diaphragm 10 serving as a common plate. The capacitor comprising housing member 16 and diaphragm 10 is designated as $C_{a1}$ and the capacitor comprising housing member 17 and diaphragm 10 is designated $C_{b1}$. The housing members 39 and 40 form separate plates of the other double capacitor with the diaphragm 11 serving as a common plate. Here, the capacitor comprising housing member 40 and diaphragm 11 is designated as $C_{a2}$ and the capacitor comprising housing member 39 and diaphragm 11 is designated as $C_{b2}$. To permit connection of capacitors $C_{a1}$, $C_{b1}$, $C_{a2}$, and $C_{b2}$ in external electrical circuits housing members 16, 17, 39, and 40 are provided with electrical terminal lugs 84, 85, 86, and 87, respectively, and the conductive spacers 60 and 62, which are connected to the diaphragms 10 and 11 by means of highly flexible coiled conductors 88 and 89, are provided with electrical terminal lugs 90 and 91, respectively, on their outer edges. To prevent direct contact between diaphragms 10 and 11 and their associated housing members, and to provide minimum spacing to prevent demagnetization, thin films of non-magnetic insulating material 16', 17', 39' and 40' are deposited on the inner conical surface and across the face of the coil assemblies of the respective housing members 16, 17, 39, and 40.

To permit the assembly A to be utilized as a pressure measuring device threaded apertures 92 and 93 are provided in spacer rings 59 and 63, respectively, which are connected in pressure tight relation to branches 94 and 95 of conduit 96 by means of threaded sleeves 97 and 98 which are threaded in apertures 92 and 93 to force the flared ends 99 and 100 of the conduit branches tightly against the seats 101 and 102 of apertures 92 and 93, respectively, whereby conduit 96 can be connected to a source of air of known pressure and the spaces between diaphragm 10 and housing member 16, and diaphragm 11 and housing member 40 can be charged with air of known pressure and sealed in such condition by means of a conventional valve 103 in conduit 96. Likewise the spacer ring 61 is provided with a threaded aperture 104 which is connected in pressure tight relation to conduit 106 by means of threaded sleeve 107 which is threaded in aperture 104 to force the flared end 108 tightly against the seat 109 of aperture 104. Conduit 106 is provided with a valve 110 which is set in its open position to permit air, whose pressure is to be compared to that of the air known or standard pressure, to enter the space between housing members 17 and 39 which communicates with the spaces between diaphragm 10 and housing member 17, and diaphragm 11 and housing member 39 through a plurality of apertures 111 and 112 in housing members 17 and 39, respectively.

As previously described, diaphragms 10 and 11 are flexibly mounted by circular bands 78 and 79. These bands are sufficiently flexible to permit movement of the diaphragms in the direction of their central axis. However, to prevent objectionable ballooning of circular bands 78 and 79 due to a difference in air pressure on opposite sides of the diaphragms the space between adjacent edges of the diaphragms 10 and 11 and their associated conductive spacer rings 60 and 62 is restricted to only a few thousandths of an inch. Diaphragms 10 and 11 are maintained centrally positioned with respect to the central axis of assembly A by the circular bands 78 and 79 which have considerably less flexibility in a radial direction due to their circular configuration.

Diaphragms 10 and 11 are magnetically stabilized between their respective housing members by means of the arrangement shown diagrammatically in Figure 3. Considering diaphragm 10 for the present, the adjacent edges of magnetic rings 25 and 33 are caused to assume north magnetic poles and the adjacent edges of magnetic rings 26 and 34 are caused to assume south magnetic poles by causing current to flow in coil 24 in a direction into the plane of Figure 3 and in coil 32 in a direction out of the plane of Figure 3. Zones 113 and 114 of diaphragm 10 are established as magnetic north and south poles respectively. This can be accomplished by inserting the diaphragms singly, in a jig having coil assemblies including magnetic poles of identical shape as coil assemblies 24, or 32, with the poles in direct contact with the diaphragms and permanently magnetizing the adjacent contacting zones of the diaphragms. It is obvious to one skilled in the art that the desired polarity of the zones of the respective diaphragms can be obtained by suitable selection of current flow through the magnetizing coils. The circular area 113 of diaphragm 10 which lies immediately opposite the adjacent edges of magnetic rings 25 and 33 is established as a north magnetic pole and the circular area 114 immediately opposite the adjacent edges of magnetic rings 26 and 34 is established as a south magnetic pole. If all these magnetic poles are of equal magnitude the repelling magnetic forces between the circular magnetic poles 113 and 114 of diaphragm 10 and the adjacent like poles of the magnetic rings 25, 26, 33, and 34 would be of equal value when the diaphragm is positioned midway between the housing members bearing coils 24 and 32. It follows that diaphragm 10 would remain in this centered position provided the air pressure on opposite sides of the diaphragm is the same. Diaphragm 11 is provided with circular magnetic south pole 115 and a circular magnetic north pole 116 similar to those of diaphragm 10. The adjacent edges of magnetic rings 46 and 53 are established as magnetic south poles and the adjacent edges of magnetic rings 47 and 54 are established as magnetic north poles by causing current to flow in a direction out of the plane of Figure 3 in coil 52. This arrangement of adjacent like poles is the full equivalent of that provided for diaphragm 10 and functions in the same manner to stabilize diaphragm 11 between its associated housing members.

The capacitors $C_{a1}$ and $C_{a2}$ diagrammatically represented in Figure 4 are connected in parallel by means of conductive jumper 117 connected between terminals 84 and 87 and by means of conductive jumper 119 connected between terminals 85 and 86 and the common jumper 118 connecting terminals 90 and 91. Since the capacitors are connected in parallel the capacitance $C_A$ between jumpers 117 and 118 is equal to the sum of $C_{a1}$ and $C_{a2}$ and the capacitance $C_B$ between jumpers 119 and 118 is equal to the sum of $C_{b1}$ and $C_{b2}$.

Capacitances $C_A$ and $C_B$ are connected as variable arms of an alternating current bridge circuit which is part of a sensing and control circuit 120. The sensing and control circuit 120 comprises a bridge having two resistive legs of fixed operating value formed by resistors 121 and 122 and two capacitive legs formed by the capacitances $C_A$ and $C_B$. One side of each of the resistors 121 and 122 is connected to terminal $123_A$ of regulated alternating current source 123 through conductor 124. The other side of resistor 121 is connected to terminal $123_B$ of source 123 through $C_B$ by means of conductor 125 which connects the resistor to the jumper 119 and the conductor 126 which connects common jumper 118 to terminal $123_A$ of source 123. The other side of resistor 122 is connected to terminal $123_b$ of source 123 through $C_A$ by means of conductor 127 which connects resistor 122 to jumper 117 and conductor 126 which connects the common jumper 118 to terminal $123_B$ of source 123. The output of the bridge which appears between points 128 and 129 is connected to the grids 130 and 131 of triodes 132 and 133 of a balanced detector.

The balanced detector comprises triodes 132 and 133 which have their plates 134 and 135 connected to terminal $123_B$ of source 123 by means of conductors 136 and 137, respectively, which connect the plates to conductor 126; and common cathode resistor 138 which has one side connected to terminal $123_A$ of source 123 through conductor 124 and the other side connected to the cathodes 139 and 140 of triodes 132 and 133 through the individual cathode resistors 141 and 142. For clarity the capacitances $C_A$ and $C_B$ are shown in dashed lines between bridge output point 129 and conductor 126, and bridge output point 128 and conductor 126, respectively. The output of the balanced detector which appears between point 143 and 144 is connected by conductors 145 and 146 to a conventional balanced input direct current amplifier 147. The positive output terminal 148 of the direct current amplifier 147 is connected to one terminal 149 of a constant voltage direct current supply 150 for energizing the plate circuit of amplifier 147 through conductor 151 connecting output terminal 148 to terminal 152 of a direct current ammeter 153 conductor 154 connecting terminal 155 of ammeter 153 to terminal $45_a$ of coil 45, conductor 156 connecting terminal $45_b$ of coil 45 to terminal $32_b$ of coil 32 and conductor 157 connecting terminal $32_a$ to the terminal 149 of supply 150. Terminal 149 of direct current supply 150 is grounded. The other output terminal 159 of amplifier 147 is connected to the ungrounded terminal 159 of plate supply 150 as shown.

Coils 24 and 52 are connected in series between terminal 149 and terminal 159 of plate supply 150 by means of conductor 160 connecting positive terminal 149 to terminal $24_a$ of coil 24, conductor 161 connecting terminal $24_b$ of coil 24 to terminal $52_a$ of coil 52, conductor 162 connecting terminal $52_b$ of coil 52 to one terminal 163 of a conventional constant current regulator 164 and conductor 166 connecting terminal 165 of regulator 164 to the ungrounded terminal 159 of the direct current source 150.

The detailed description of operation of my device will be for its use as an aircraft altimeter, since it is particularly suitable for such use. Initially, both valves 103 and 110 are opened to permit air of a known pressure to fill the spaces between diaphragms 10 and 11 and each of their respective housing members. The air of known pressure could be that of the atmosphere at ground level at some particular airfield or that of a source corresponding to a selected reference altitude. For the case at hand the air used for initial adjustment is assumed to be at a pressure corresponding to standard at sea level. The output of the direct current amplifier 147 is then adjusted, by varying resistor 138, so the ammeter indicator is in a position corresponding to zero altitude reading. Under these conditions, the pertinent forces acting on the diaphragms are those repelling forces produced by action of the restraining coils 24, 52 and the restoring coils 32, 45. The diaphragm will then come to rest at the position where these forces are equal, which position will be substantially midway between the faces of magnetic rings 25, 26; 33, 35 and 46, 47; 53, 54. The valve 103 is then closed, and remains closed so long as the chosen pressure reference remains unchanged. Now, assuming the assembly A is at an altitude above sea level, and valve 110 is opened to the atmosphere, the pressure of the air in the inner spaces comprising capacitors $C_{b1}$ and $C_{b2}$ will be decreased, while the pressure in the outer spaces comprising capacitors $C_{a1}$ and $C_{a2}$ will remain at its initial pressure. Consequently, diaphragms 10 and 11 will tend to move toward their respective housing members 17 and 39 thereby increasing the values of $C_{b1}$ and $C_{b2}$ and decreasing the values of $C_{a1}$ and $C_{a2}$. It follows that $C_A$ decreases and $C_B$ increases accordingly. Since $C_A$ and $C_B$ are connected as arms of the bridge circuit having the additional resistive arms 121 and 122, the resultant increase in capacitive reactance of $C_A$ and decrease in capacitive reactance of $C_B$ changes the bridge balance and causes the potential of output point 128 to decrease and that of output point 129 to increase. Since grids 130 and 131 of tubes 132 and 133 of the balanced detector are connected to these output points the potentials of these grids also follow those of bridge output points 128 and 129 and thereby increase the plate resistance of tube 132 and decrease the plate resistance of tube 133. This causes the potential of output points 143 and 144 of the balanced detector to decrease and increase, respectively. The output of the conventional D. C. amplifier 147 is such that when the potential of input lead 145 connecting point 143 to one input terminal of the amplifier decreases with respect to the potential of the other input lead 146 which connects output point 144 to the other input terminal of the amplifier, the output current of the amplifier increases. Since coils 32 and 45 are in series with the output of amplifier 147, their current also increases thereby increasing the magnetic strength of their associated magnetic rings 36, 34, 46 and 47 which results in a greater repelling magnetic force on diaphragms 10 and 11 tending to push them outwardly toward their respective outer housing members 16 and 40. The repelling magnetic forces emanating from coils 24 and 52 remain constant since these coils form a constant load with regulator 164 between the constant voltage source 150 and ground. Therefore, the increased repelling magnetic force emanating from coils 32 and 45 causes the diaphragms to tend to move back toward their respective outer housing members in opposition to the higher air pressure of the standard volume of air tending to move them in the other direction. Now if no corrective force had been generated, physical limits permitting, the diaphragms would have moved a certain relatively great distance toward housing members 17 and 39 until they come to rest at a position representing a new balance of forces. The total displacement of the diaphragms from the initial to the new position would be a measure of the pressure change, or altitude change. However, in the system according to my invention, diaphragm displacement from a given place of rest causes a restoring force to be generated. This restoring force causes the diaphragms to come to rest at a point which is displaced from the initial position by a distance which is equal to the distance they would have been displaced, physical limits permitting, had no restoring force been applied, divided by the amplification factor for the system. The total amount of restoring force being applied for a given position of the assembly A is a direct measure of the altitude at that location. Thus the meter 153 which measures a current proportional to total restoring force, can be calibrated to read altitude directly. More generally speaking, the current measured by the meter 153 is proportional to the difference of pressure between the inner and outer chambers of the assembly A.

It should be apparent from the foregoing that the transducer of my invention is advantageous in numerous aspects. Because my transducer embodies generation of a restoring force in an amplified system in opposition to diaphragm displacement, the total movement of my diaphragms over the entire measured range need be only a fraction of that which would otherwise be required. Since my system is electrical, very high amplification factors are readily obtainable. This means that the total lateral movement of the diaphragms over the entire measurement range need only be a very small amount. The fact that my system requires only a very small total diaphragm movement makes the magnetic suspension arrangement feasible. This also means that the total required lateral movement of the diaphragms is so slight that lateral forces, if any, which are introduced by the flexible supporting rings 78, 81, are negligible. My transducer system is the equivalent of a spring system, but without the attendant disadvantages of a spring system. In my system, as in the case of a spring, restoring force is proportional to displacement, but in my system, the "spring constant" (restraining force) is readily variable over a wide range, which means the system can readily be made to operate over an extremely wide range of pressure differences. Also, with my "electrical spring" system, there is no fatigue factor, and there is nothing to wear out. My system is further advantageous in that its speed of response is adjustable, by changing the time constants in the amplifier loop.

The structural arrangement of my diaphragm assembly A has numerous advantages. The cone-shaped center sections of the diaphragms and the housing walls ensures ruggedness and rigidity. The oppositely disposed arrangement of the separate diaphragms and their housings coupled with the fact that the sensing devices associated with outer housing walls are in parallel and the sensing devices associated with the inner housing walls are in parallel, means that compensation for such extraneous effects as vibration, acceleration, changing gravitational forces, uniform sag of walls or diaphragms, variations in input voltages, and temperature of the structure, is automatically and effectively achieved by simple cancellation. In other words, any tendency of portions of the conical sections to move closer to each other laterally due to one or more such extraneous effects is compensated by the fact that corresponding other portions will move further away from each other to a like degree. It will further be apparent that my transducer is advantageous in that essentially the only moving parts are the diaphragms, and the only parts subject to wear due to friction or flexing are the diaphragm supporting rings. Since the diaphragm movement range is so small, wear on the supporting rings will be minor.

The transducer of my invention is a very versatile device. Its use as an altimeter, or pressure difference measuring device has already been described. By disconnecting the compensating portion, the device can be used as an accelerometer. This can also be accomplished by using an additional sensing means on one diaphragm only, in which case the device can measure altitude and acceleration simultaneously. Also, by using separate amplifiers for the restoration of the two diaphragms, and introducing suitable computation processes between their outputs, altitude and acceleration can be measured simultaneously without the additional sensing means. By an electrical differentiating process, the device can be made also to measure rate of change of pressure, or rate of climb. Further, by introducing a standard pressure on one side of the diaphragms, and a vacuum on the other side, the device will again measure pressure difference, or degree of vacuum, and thus becomes a vacuum gauge.

Another use of my versatile transducer is to measure forces as in a sensitive balance scale. For this use, a single diaphragm is suspended (levitated) above a single magnetic structure. In this case the restraining force for my "electrical spring" device will be provided by the weight of the diaphragm and the force to be measured (which could be the weight of material supported by the diaphragm). The restoring force then would be provided by the magnetic structure fed by an amplifier the output of which is governed by sensing devices in the manner as hereinbefore described. The amount of restoring force required for balance would then be a measure of the restraining, or unbalance force applied. The weight or unbalance force being measured could be read directly from a suitable indicating device.

I am aware of the possibility that the capacity sensing arrangement which I have described herein may be adversely affected by changing humidity conditions. This situation may be remedied by special treatment of the nonstandard air before it passes into the diaphragm chambers, as for example, by passing it over a moisture absorbing medium. It is also within the scope of my invention to utilize inductive instead of capacitive sensing means. The inductive pick up means could comprise a plurality of pick-up coils disposed about the outer surfaces of the diaphragm housing walls. Each coil would have a U shaped core with the surfaces of the open faces of the U being spaced symmetrically from the diaphragm surface. The diaphragm then forms a portion of the magnetic circuit for each coil. Movement of the diaphragm will vary the characteristics of the magnetic circuit associated with each coil, and hence the inductance thereof. Details of this and other possible inductive pick-up arrangements are well known to those skilled in the art. Furthermore, my invention is not restricted to the specific electronic circuit shown and described, since other equally effective circuits for the amplifier loop are available.

While I have shown my invention in only one form, it will be obvious to those skilled in the art that it is not so limited, but is susceptible of various changes and modifications without departing from the spirit thereof. The foregoing disclosure and drawings are merely illustrative of the principles of my invention, and are not to be interpreted in a limiting sense.

I claim:

1. A pressure responsive system comprising a transducer having a first movable diaphragm of magnetic conductive material disposed in spaced relation between first and second conductive plates, a second movable diaphragm of magnetic conductive material disposed in spaced relation between third and fourth conductive plates, all of said plates being disposed on a common axis, the spaces between said first plate and said first diaphragm and said fourth plate and said second diaphragm being occupied by a fluid of known pressure, and the spaces between said second plate and said first diaphragm and said third plate and said second diaphragm being in communication with each other and occupied by a fluid of unknown pressure, whereby each of said plates with its associated diaphragm comprise capacitors whose capacitance is a function of the known and unknown pressures of said fluids; means connecting the capacitors comprising said first and fourth plates in parallel as one arm of a bridge network and connecting the capacitors comprising said second and third plates in parallel as another arm of said bridge network whereby the output of said bridge network varies as a function of the capacitance of said capacitors, and electromagnetic means responsive to the output of said bridge network for positioning said diaphragms.

2. A pressure responsive system comprising a transducer having a movable diaphragm disposed in spaced relation between two plates positioned in fixed spaced relation to each other, the space between one plate and said diaphragm being occupied by a fluid of fixed pressure, and the space between the other plate and said diaphragm being occupied by a fluid of varying pressure, one of said plates and said diaphragm forming a capacitor, means for applying a fixed magnetic restraining force on one side of said diaphragm, means for applying a variable magnetic restoring force on the other side of said diaphragm, said last mentioned means including an amplifier whose output is controlled responsive to variations in the capacitance of said capacitor, whereby the magnitude of said restoring force is a function of the difference between said pressures.

3. A pressure responsive system comprising a transducer structure having a pair of movable diaphragms each disposed between a pair of spaced plates, the surfaces of said plates and diaphragms being all disposed in generally parallel relation, means for introducing a fluid medium of reference pressure into the inner or adjacent compartments formed by said diaphragms and plates, means for introducing a fluid medium of variable pressure into the outer or remote compartments formed by said diaphragms and plates, separate sensing means disposed on each side of each diaphragm to sense diaphragm movements, the outputs of the sensing means for the adjacent or inner sides of said diaphragms being connected in additive relation, the outputs of the sensing means for the outer or remote sides of said diaphragms being also connected in additive relation, whereby diaphragm displacements due to certain undesirable extraneous factors will be automatically compensated.

4. The invention in accordance with claim 3, wherein the surfaces of said plates and diaphragms are non-planar but are parallel to each other and each is symmetrical about a central transverse axis.

5. A transducer structure comprising a movable diaphragm disposed between a pair of fixed spaced plates, a pair of electric coils each enclosing an area equivalent to a substantial portion of the area of said diaphragm, each said coil being surrounded except on one side by a circular channel-like housing of magnetic material, said coils being disposed on opposite sides of, adjacent to and axially aligned with, said diaphragm with the open sides of the housings facing the diaphragm, said diaphragm having pre-magnetized zones opposite said coils, means for energizing said coils to cause magnetization of said housings such that they exert opposite repelling forces on said diaphragm, whereby said diaphragm is magnetically suspended between said plates.

6. A pressure responsive system comprising a transducer having a movable diaphragm disposed in spaced relation between two plates positioned in fixed relation to each other, the space between one plate and said diaphragm being occupied by a fluid from a first pressure source, and the space between the other plate and said diaphragm being occupied by a fluid from a second pressure source, one of said plates and said diaphragm forming a capacitor, means for applying a fixed magnetic restraining force on one side of said diaphragm, means for applying a variable magnetic restoring force on the other side of said diaphragm, said last mentioned means including an amplifier whose output is controlled responsive to variations in the capacitance of said capacitor, whereby the magnitude of said restoring force is a function of the difference between said pressures.

7. A pressure responsive system comprising a transducer having a movable diaphragm disposed in spaced relation between two plates positioned in a fixed space relation to each other, the space between one plate and said diaphragm being occupied by a fluid from a first pressure source and the space between the other plate and said diaphragm being occupied by a fluid from a second pressure source, one of said plates and said diaphragm forming a capacitor, means for applying a fixed restraining force on one side of said diaphragm, means for applying a variable restoring force on the other side of said diaphragm, said last mentioned means including an amplifier whose output is controlled responsive to variations in the capacitance of said capacitor whereby the magnitude of said restoring force is a function of the difference between said pressures.

8. A pressure responsive system comprising a transducer having a movable diaphragm disposed in space relation between two plates positioned in fixed spaced relationship to each other, the space between one plate and said diaphragm being occupied by a fluid medium from said first pressure source and the space between the other plate and said diaphragm being occupied by a fluid medium from a second pressure source, one of said plates and said diaphragm forming a capacitor, means for applying a restraining force on one side of said diaphram, and means for applying a variable restraining force on the other side of said diaphragm, the last mentioned means including a means whose output is controlled responsive to the variations of the capacitance of the said capacitor, whereby the magnitude of said variable restoring force is a function of the difference between the said pressures.

References Cited in the file of this patent
UNITED STATES PATENTS

| | | |
|---|---|---|
| 2,371,040 | Fisher et al. | Mar. 6, 1945 |
| 2,571,863 | Godsey | Oct. 16, 1951 |
| 2,593,339 | Ostermann et al. | Apr. 15, 1952 |
| 2,660,056 | Schuck et al. | Nov. 24, 1953 |
| 2,685,200 | Slottow et al. | Aug. 3, 1954 |
| 2,696,566 | Lion et al. | Dec. 7, 1954 |